United States Patent [19]

Sclafani

[11] Patent Number: 5,956,074
[45] Date of Patent: Sep. 21, 1999

[54] CABLE TELEVISION RETURN DISPLAY UNIT

[76] Inventor: Peter J. Sclafani, 317 Hubbs Ave., Nauppauge, N.Y. 11722

[21] Appl. No.: 08/814,227
[22] Filed: Mar. 11, 1997
[51] Int. Cl.$^6$ ..................................................... H04N 17/00
[52] U.S. Cl. ................................ 348/6; 348/192; 348/184
[58] Field of Search ................................... 333/17.1, 17.3; 324/51, 66, 67, 539, 528, 532, 533, 76.13–76.38; 348/6, 192, 184, 193; 455/6.1, 4.1, 67.1, 67.3, 67.4, 5.1, 4.2

[56] References Cited

U.S. PATENT DOCUMENTS

| 4,007,423 | 2/1977 | Dickerson | 325/67 |
| 4,520,508 | 5/1985 | Reichert, Jr. | 455/4 |
| 4,700,222 | 10/1987 | Large et al. | 358/86 |

OTHER PUBLICATIONS

Eldering et al, CATV Return Path Characterization for Reliable Communications, IEEE Aug. 1995.
Zhang et al, Automatic Monitoring of the Quality of Cable Television Pictures, IEEE Sep. 1992.

Primary Examiner—Nathan Flynn
Assistant Examiner—Uyen Le
Attorney, Agent, or Firm—Thomas A. O'Rourke

[57] ABSTRACT

A cable television monitoring system to monitor the return signals of a CATV system is disclosed. The system monitors the CATV system in a frequency range of 5–225 MHz and measures voltage and frequency parameters. The system provides an analysis in NTSC compatible base-band video which, when modulated to TV channel frequency and sent downstream in a cable TV system can be received at any point in a cable TV system.

15 Claims, 5 Drawing Sheets

CABLE TELEVISION RETURN DISPLAY UNIT

BACKGROUND OF THE INVENTION

1. Field of the Invention

This invention relates to cable television communication systems. More particularly, this invention relates to a cable television system's return display unit (RDU), more specifically a unit which monitors the cable television system's return system to allow for activation and maintenance of the return system and to troubleshoot ingress, noise, "babbling box" problems from converters and modems and flatness of response.

2. Description of Related Art

Systems utilizing cable television have grown in importance and use over the years. Such systems employ coaxial cables, which provide excellent shielding from electromagnetic interference and radio frequency interference, to transmit television signals and other electronics communications signals to receivers. Originally, cable transmission was used in locations that could not receive broadcast transmissions directly because of distance or because of interfering buildings or terrain. In recent years, cable transmissions have become popular even in areas where reception of broadcasted television signals is satisfactory. In these areas, cable transmission provides additional channels and new services which were not available from broadcast television stations and provides programs with enriched content.

Cable television operates where a cable television (CATV) signal distribution system collects television and other electronic communications signals from various sources. Examples of such sources are a satellite receiving station, large antennas for off-the-air transmissions, or a signal directly from a locally generating source by telephone line, cable, microwave, etc. These signals are collected at a head end where they are processed and placed in a form which will be retransmitted to the various subscribers. A head end is the control center of a cable television system, where incoming signals are amplified, converted, and routed to subscribers through trunk and feeder paths of the system. Coaxial cables are used to connect bridge and line amplifiers to subscriber taps. Coaxial cables may be used for the trunk lines, as well as hybric fiber coaxial cables (HFC cables) and fiber optic lines, both of which provide for better transmission. To compensate for the amplitude loss of the combined television signals in the cables, amplifiers are located at spaced intervals along the cables. Amplifiers compensate for the drop in power level due to losses in the CATV system and due to the splitting which occurs as a cable signal progresses from the head end towards the subscribers. Amplifiers increase the magnitude of input signals to a prescribed operating parameter. The distribution network between the head end and the attached user devices also includes splitters, directional couplers, and taps that direct signal flow along desired paths. Filters that process signals depending on their frequency, and outlets that connect devices to the network.

Bidirectional CATV systems have become increasingly popular and supply customers with additional services, such as data communications and interactive videotext. To achieve bidirectional signal distribution, basic approaches can be employed.

One approach involves two-way communications over a single coaxial cable, with different frequency bands carrying signals in opposite directions.

Another approach to obtain bidirectional signal distribution involves two-way communications over dual coaxial cables, with each cable carrying signals in one direction.

Two-way communications can be implemented on a single coaxial cable by dividing the available frequency spectrum on the cable into two bands. These bands carry signals in opposite directions, called forward or downstream (away from the head end) and return, reverse or upstream (toward the head end). Devices attached to the network transmit to the head end on the return band, and receive from the head end on the forward band.

Two-way communications can also be implemented on two-way dual cable systems using two coaxial cables laid side-by-side. One cable provides the inbound (return) path signals to the head end. The second cable provides the outbound (forward) path signals from the head end to the attached devices.

In these 2-way cable television systems, various methods have been used to monitor the return system for numerous problems and performance measures, such as ingress, noise, "babbling box," converter problems and flatness of response. In the past when system problems arise, a service technician must go on-site to determine the source of the malfunction. This prior art method of determining the source of a malfunction is a time-consuming and difficult task.

The current state of art for monitoring the performance of return signals includes a spectrum analyzer/camera set up. A spectrum analyzer is a device which sweeps over a portion of the radio-frequency spectrum, responds to signals whose frequencies lie within the swept band, and displays them in relative magnitude and frequency on a cathode-ray-tube (CRT) screen. The system is typically set up for the 5–40 MHz spectrum. A video camera, placed above the CRT screen of the spectrum analyzer, transforms an optical display of the CRT screen into a video output. The output of the camera is modulated onto an open CATV channel on the system thru a standard CATV modulator. This system enables maintenance technicians to monitor the return system for problems or malfunctions. A spectrum analyzer/camera system common in the prior art is capable of monitoring the return system, however the system offers low resolution and is unstable inherently. It is spacious and takes up expensive head end real estate. The camera also requires periodic maintenance and frequent adjustments, especially if it shifts during operation. The spectrum analyzer/camera set up also is suspect to change as all spectrum analyzer controls are available to change without the knowledge of the field personnel viewing the screen. Lighting for the set up is another issue. Doors opening and closing, lights going on and off create dark, glaring or shadowed images which impact the reliability of the spectrum analyzer/camera set up. This prior art approach is clumsy and is accepted only in lieu of a better method. The present invention eliminates the spectrum analyzer camera duo.

OBJECTS OF THE INVENTION

On object of this invention is to provide a novel CATV monitoring system to monitor the return system for detecting ingress, noise and "babbling box," converter problems and to monitor quality of transmission within a prescribed range of performance parameters.

Another object of this invention is to provide a novel CATV monitoring system to monitor the return system of a CATV system by replacing the unreliable spectrum analyzer/camera set-up used in the prior art and enables the system to receive, at the transmit site, signals having completed the travel through a transmission loop.

Still another object of this invention is to provide NTSC compatible base-band video of return signal spectrum at the head end. This base-band video can be modulated to TV compatible channels for down stream transmission.

SUMMARY OF THE INVENTION

This novel CATV monitoring apparatus monitors the return system of the cable television system and includes a head end, a power supply board, a spectrum analyzer board, a central processing unit (CPU) board, and a video board.

With this novel invention, an external carrier generator produces CW return signals which are injected into the cable TV return path. These signals may be generated by a field technician trouble-shooting the system, whereby the technician inputs a signal from a return generator into the return system of the cable television system. These signals are directed towards the head end of the cable television system. Once analyzed by the RDU, the technician is capable of obtaining a signal from the RDU which will enable the technician to trouble-shoot the system, test the upstream signal for accuracy, and determine if any fault lies in the system.

Prior art systems directed these signals to a Cathode-Ray-Tube (CRT) of a spectrum analyzer to a camera to produce a video base-band output. Instead, this apparatus interprets those return signals, converts them to a display of frequency domain and analog voltage corresponding to signals received at the head end. The analog voltage goes to an Analog/Digital Converter. Once digitized, the CPU stores the data in random access memory (RAM). A video processor extracts the data from RAM, converts it to a baseband NTSC (National Television System Committee) composite video signal. That video signal is then sent through a standard TV modulator to the forward path of the cable TV plant where standard TV's can display it. Applicant's unit allows system personnel to view in real time the condition of the cable television return system and view in real time the results of their installations and service. This enables a technician to determine whether any problems exist in the system, namely from the point of testing and upstream to the head end.

The system of this invention takes up approximately three inches of rack space, like a modulator. This is a major improvement over the bulky prior art systems of spectrum analyzer/camer duo.

System performance parameters for the RDU unit to display are programmed at the head end by the end user. The RDU is connected to the radio-frequency (RF) return lash up in the same manner as a spectrum analyzer. The output of the RDU is a NTSC composite video, 1 v P—P, which is fed to the modulator of choice to be converted to a TV channel for downstream transmission.

Television signals are transmitted over a cable network where channels operating at different frequencies are multiplexed. The signals for each channel are transmitted generally in a TV compatible format such as the NTSC signal.

The RDU takes X and Y output information generated by a spectrum analyzer and converters it to NTSC video format for input to a standard CATV modulator. System operators and technicians now can monitor the return system from any point in the cable system on any television, viewing a spectrum analyzer screen without the traditional spectrum analyzer/camera set up. The RDU provides a TV-ready video output for the cable TV return spectrum, i.e. 5–40 MHz and 5–250 MHz.

To address the carrier resolution issue, the RDU displays real time, carrier level at two frequencies in the return bandwidth. Resolution for the RDU unit is typically about 0.5 db. This allows field personnel to view on screen the level at the head end in real time when injecting test carriers from a subscribers home or at amplifiers and fiber nodes in the system. A technician can change a pad 1 db in a system amplifier and see a 1 db change at the head end.

The RDU provides a tool to maintain the return system. Return levels can be documented from every installation and service call with system problems generated as with the forward system, and enables operations personnel to track the return system.

The RDU takes an analog input signal in a band of 0 to 230 MHz, more preferably in the range of 2–55 MHz, spectrum-analyzes it and then processes the signal thru an analog/digital (A/D) converter, continuously storing pertinent data in shadow RAM. Every 500 milliseconds, it downloads the data into video RAM where it is prepared for display on the screen. All carriers and energy that occur during the 500 milliseconds is stored in shadow RAM much like a peak hold function on a spectrum analyzer, allowing the RDU to display all ingress and noise that occurs on a live transmission, updating the data every 500 milliseconds. Thus the TV continuously display is refreshed every 500 milliseconds.

In the system of this invention the RDU video output provides a spectrum analyzer (Level vs Frequency) display with user programmed system/node information and head end return carrier levels between 5 and 40 MHz. The Receive levels at the head end provide documentable, consistent RF return level readings for all service calls and installations. Knowledge of these levels is an indispensable tool for an operator looking to manage and maintain his return system. It would be a simple matter for all service and installation technicians to inject 2 or more carriers with an external portable signal generator at the input to the converter or modem at a remote site and record the level on those carriers back at the head end at the time of installation or service. This shall provide the beginning of tracking and troubleshooting system signatures issues and problems. System technicians would report as system problems where levels exceeded or failed to meet preset windows, the same as forward level problems.

Normally, the RDU shall display −30 db when the noise floor is at its normal level with up to 100 nodes and a string of system amplifiers connected to it, approximately 4 HFC 500 home nodes. The noise floor will begin to lift as subscriber drops are added. Ingress may appear as problem drops are connected. The RDU becomes an important tool in monitoring ingress/noise. The carrier level read outs will increase as the noise increases providing additional valuable information to be recorded and used. The technician records the levels as displayed without injecting carriers. A −10 db reading at this time would indicate that the noise floor has picked up 20 db. Again windows can be set by management and all readings outside the window can be defined as system problems needing attention.

The return carrier generator is an important piece of test equipment. It has to be stable and repeatable. Construction must be rugged to stand up to system operations. A TV to view the return screen is needed in the present invention.

One method in which applicant's invention may be utilized is where a field technician tests the system along the feeder system, or one of the branches, by sending a 5.0–40.0 MHz signal (via a return generator) upstream towards the head end where the RDU interprets and analyzes the signal and provides feedback downstream to the technician. Once the technician receives this signal from the RDU, the technician is capable of determining the clarity of the signal, malfunctions in the system, and the location or source of these problems.

Applicant's invention may also be utilized to maintain and balance the system by continuously forwarding signals to the RDU for interpretation and analysis. In effect, the unit can function as a status monitoring system resulting in a permanent way to maintain system integrity for a cable television system.

Applicant's invention can also be utilized by a cable television installer to verify if the house drop, i.e. the connection from a CATV system to a subscriber's receiver, is present at the installation suite. The installer will be able to verify that the system is functioning properly and the channels and frequencies are received properly. Subsequent to the installation process, a technician will be able to test the system at a subscriber's location.

Applicant's RDU unit can be used with CW (continuous wave) sweeps and live signals. The RDU can be modified to convert all TV signals in the forward path to a TV compatible display with adjustable scales of grid and programmable screen characters (alpha-numeric).

Applicant's invention facilitates the monitoring of return signals from any point on a cable television system by means of a television, and does not require any additional equipment.

DETAILED DESCRIPTION OF THE DRAWINGS

Figure 1:
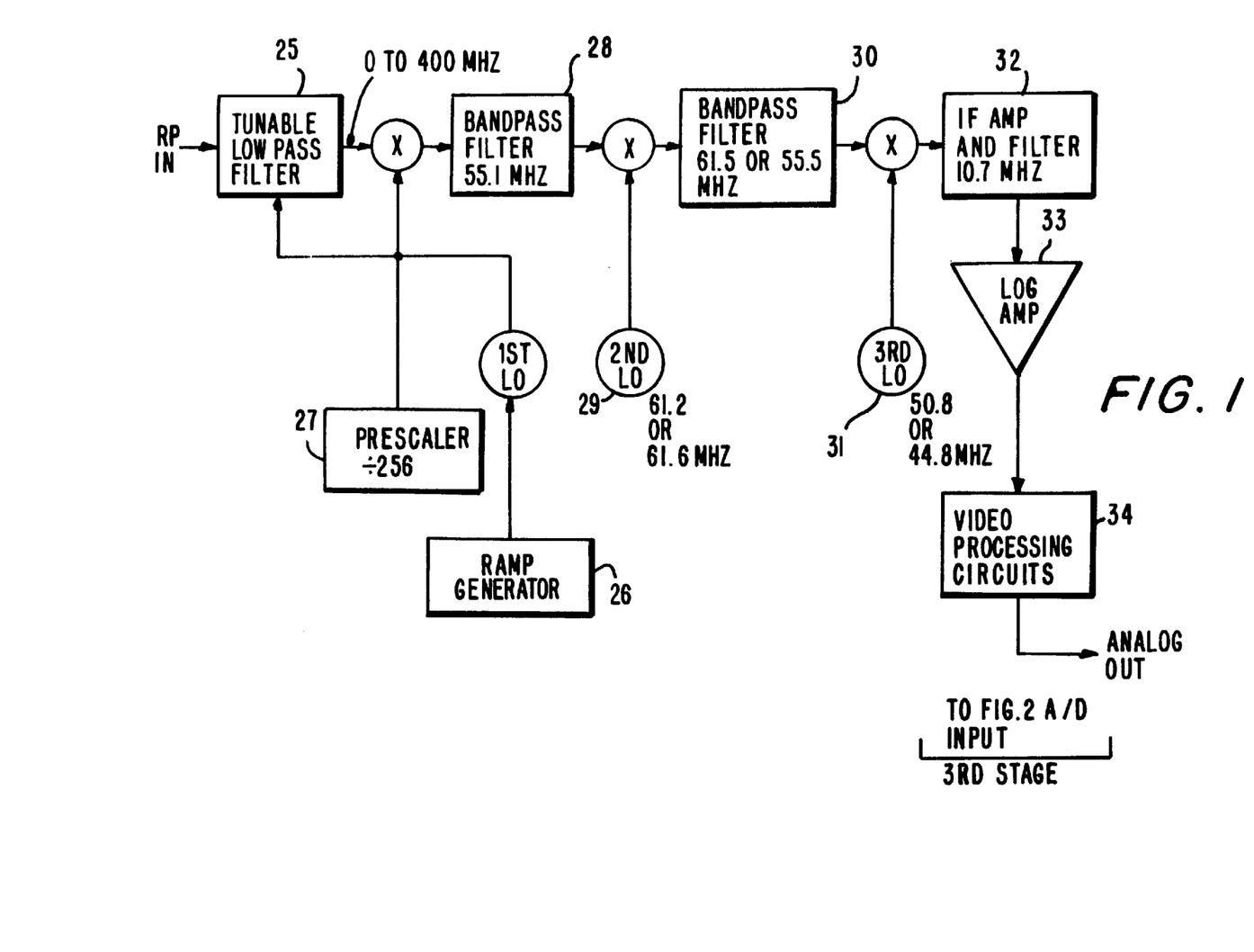
FIG. 1 is a schematic diagram of a novel CATV monitoring system to monitor the return system.

FIG. 1 is a schematic of the return display unit (RDU) which monitors the cable television return system.

As is typical in a CATV system, the system includes a head end where a plurality of signals from various sources, such as transmissions from satellites, microwave sources, telephone lines, etc. are gathered and converted to appropriate frequencies for transmission over coaxial cables to subscribers. This typical CATV system is capable of passing reverse signals back to the head end.

The RDU unit may consist of four main sub-assemblies, a power supply board, a spectrum analyzer board, a CPU board and a video board. Applicant's RDU unit is located at the head end where a plurality of signals are received.

Power supplies of +5 VDC, +12 VDC and –12 VDC are utilized to supply power to the Spectrum Analyzer, CPU and Video Boards. A +5 VDC power supply powers up the spectrum analyzer which has a requirement of 130 Ma, and the CPU and video boards which have a requirement of 180 Ma, the combined requirements totaling 310 Ma. A +12 VDC power supply also powers up the spectrum analyzer which has a requirement of 74 Ma, and the CPU and video boards which have a requirement of 4 Ma, the combined requirements totaling 78 Ma. A –12 VDC also powers up the spectrum analyzer which has a requirement of 8 Ma, and the CPU and video boards which have a requirement of 33 Ma, the combined requirements totaling 41 Ma.

Two additional power supplies of +6 VDC and –25 VDC are utilized to supply power to the operation of the Spectrum Analyzer circuitry, the +6 VDC requirement is 2 Ma and the –25 VDC requirement is 5 Ma. It should be noted that the power requirement for the entire RDU system is less than 500 Ma, fused with a 750 Ma fuse.

In FIG. 1, the reverse field analog signal is in I-F format. This signal has already been processed by the spectrum analyzer. Basically, the spectrum analyzer is an up-converting superheterodyne receiver outfitted with a visual display.

In up-conversion, the input frequency is converted to a first IF that is above the highest input frequency to be received. This places the image frequency well beyond the range of desired input frequencies so that a fixed-tuned preselector filter can be used. The low-pass filter used in the front end of the analyzer does not need to be frequency swept, so only the local oscillator (LO) frequencies determine the frequency to which the spectrum analyzer is tuned. A second frequency conversion is required to obtain the required selectivity of the high first IF. A third frequency conversion may be necessary because the first IF of a VHF of UHF spectrum analyzer is well into the UHF region.

For a typical spectrum analyzer, the input frequency range is chosen to be from 0 to 400 MHz. The first IF, which is required to be above the highest input frequency, is typically 516 MHz. A typical spectrum analyzer can have an ultimate IF bandwidth of about 10 KHz. So a second conversion to 61.5 MHz and a third conversion to 10.7 MHz is provided.

The information generated by a spectrum analyzer is indicative of amplitude of the input signal vs. frequency. The dynamic range of the input signal can range a wide range, typically 60 dB or more.

Only the RF module of a conventional spectrum analyzer is used in the present invention, and it capable of converting all frequency, 0–400 MHz band, to 10.7 MHz, where standard receiver IF filters are used. The spectrum analyzer output is a low level analog signal indicative of amplitude and frequency of input signal. This is processed to a digital format for proper timing and manipulation for a TV screen display. The analog signal output from the spectrum analyzer, typically in the range of approximately 400 millivolts, is supplied to two digital potentiometers 4, 5, which contain a resistance to control and monitor the output of the spectrum analyzer. Since the spectrum analyzer input is in millivolts, the signal is further amplified through a plurality of amplifiers 5, 6, 7, 8 for better Analog/Digital (A/D) resolution and produce output signals within a prescribed range of operating parameters. Amplifier 5 has a gain of 20 db. These amplifiers produce an output signal of typically about 4 volts. This will enable the analog/digital (A/D) converter to operate on the output signal. The (A/D) converter is a 10-Bit converter and requires an input signal in the range of 0 to +5 VDC. Thus with aid of potentiometers and amplifiers, the circuit can discipline the level of the signal output from the spectrum analyzer and direct them to the (A/D) converter.

An (A/D) converter converts analog output signals from the amplifiers into a digital format. The resulting digital format corresponds to the signal strength of the incoming analog signal. The (A/D) converter includes a main clock 10 for timing control which includes a temperature controlled Xtal Oscillator (TCXO) 10A, to maintain an accurate 20 MHz frequency to set the proper timing for the system. It also includes a flip flop 10B which shapes the 20 MHz oscillation into a square wave and divides the frequency by 2. This resulting 10 MHz signal becomes the operating frequency for the Microcontroller 11. The output of the A/D converter is connected to the memory bus of the Microcontroller 11, in a preferred embodiment the microcentroller is the Intel 80C196KB-12 chip. The Microcontroller acts as the traffic cop to control all the timing requirements of the RDU and assigns address codes to digital bytes. It has an 8 bit Data Bus and a 16 bit Address Bus. Buses are used for transferring data between computer peripherals and the CPU, for transferring data between the CPU and memory, and for transferring data between different points within the CPU. A data bus contains lines for carrying "data" from one location to another. An address bus bears address codes which specify the destination for data on the bus. The data on the data bus will match up with the address lines on the address bus at memory, namely Read Only Memory (ROM) 16 and Non-Volatile Random Access Memory (RAM) 17, and Shadow Random Access Memory (RAM) 18.

Address lines comprising the address bus initially pass through two decoders 12, 13. These devices assign addresses to various devices and also act as traffic controllers. Additional decoders 14, 15, 15A, 15B are located on the address bus. Decoder chip 15 is a 3 to 8 decoder. During the operation of the decoder chip, only one of 8 output pins can go low at any one time. The decoding is based on address bits, A13, A14, and A15, making any output pin low for 8K chunks at a time. Outputs Y0 through Y3 are used to select the ROM chip 16 at Address 0000H to 7FFFH. Output Y4 selects Non-Volatile RAM 17, at address 8000H to 9FFFH. Output Y5 selects System RAM 18 at Address A000H to BFFFH. Output Y6, selects the Video Display information, located on the Video Board, at Address C000H to DFFFH.

Decoder 14 is an 8 input Nor gate, used to decode 0000H to 00FFH. This decoder prevents the ROM from being selected during the selection of these lower addresses. These address locations are used by the Microcontrollers internal memory. This results in an address bus which instructs ROM 16 and Non-Volatile RAM 17, and Shadow RAM 18 to either remain in an open state to accept data or remain in a closed state and not accept data.

ROM 16 is a 32K×8 bit Read Only Memory. The address for ROM is 0000H to 7FFFH. This ROM contains all the software coding to operate the system. However, ROM does not perform any data processing. ROM moves data around. Data from ROM is inputted into the Non-Volatile RAM 17. The Non-Volatile RAM, 17 is an 8K×8 bit special low power RAM. It's Address location is 8000H to 9FFFH. It retains it's memory when power is turned off due to a special battery back up socket. This battery back up socket contains a 3 volt battery and switching circuitry to maintain power to the RAM during low or no power situations. This socket is manufactured by Dallas Semiconductors, with a part number of DS-1216B. Non-Volatile RAM contains operational information requirements that must not be destroyed when power is off. Information storage is ensured with the battery backup.

Data flows from ROM 16 into the Non-Volatile RAM 17 and stored on a real time basis. When the Non-Volatile RAM 17 is full with data, the data is downloaded to the shadow RAM 18.

Shadow RAM, 18 is an 8K×8 bit Static RAM. Its Address location is A000H to BFFFH. Shadow RAM is a RAM copy of a PC's ROM BIOS, it is faster to access Shadow RAM than it is to access ROM. The Shadow RAM's main purpose is for temporary storage of video data.

The data transferred to shadow RAM is still in digital format. Digital data from the shadow RAM is outputted to the video board, which consists of the following modules: a transceiver 19, latches 20, 21, 22, video RAM 23, and a video display generator 24a, 24b, 24c, 24d. Data carried on the data bus is introduced to the transceiver 19 which consists of a transceiver chip, 19 and is selected at Address C000H to DFFFFH. The purpose of the Transceiver is to isolate the Video Data Bus from the Main Data Bus. It allows the CPU Data Bus to write to Video RAM and can also read Video RAM onto the Main Data Bus. Whether it reads or writes depends on the state of the DIR pin of U5.

The address bus is directed to latches 20, 21, 22. The latches, 20, 21, 22, isolate the Main Address Bus from the 13 Bit Video Address Bus. They are selected and latched during Address C000H to DFFFH, allowing the CPU to control the Video Address Bus. During all other Addresses, the Video Display Generator has command of the Video Address Bus.

Through the transceiver 19, the CPU Data Bus writes to Video RAM 23. Similarly, information on the video address bus is also directed to Video RAM 23. Video RAM, is an 8K×8 bit Static RAM. This chip is selected by a control line from the Video Display Generator, (U9 pin 37). The display area on the screen consist of 256 horizontal bits and 192 vertical, thus 6,144 bytes are used for bit mapping of the Video RAM.

A digital signal from the video data bus is directed to the video display generator 24A along with corresponding information from the address bus. The video display generator 24A is composed of a video display generator 24A, an inverter 24B, an amplifier 24C and an oscillator 24D.

The Video Display Generator, 24A is a Motorola MC6847Y. It sets up all the timing necessary to convert a digital signal from the Video Data Bus, to a composite signal, with all the proper NTSC levels and timing for output to standard TV screen, via a Modulator.

The Inverter 24B is used to set up the right polarity to be used as an interrupt to the Microcontroller, to let it know when the Video Bus is available for CPU control. The Amplifier, 24C is used to invert the NTSC composite video output and provide the proper drive and impedance for an external Modulator. The voltage required by the external modulator is 1 volt, peak to peak. Xtal 24D is a 3.58 MHz Xtal Oscillator, along with 24E are used as the timing for the Video Display Generator chip.

The resulting signal from the video display generator is a composite NTSC video baseband which is inputted to an external modulator and processed for output to a standard T.V.

Figure 2:
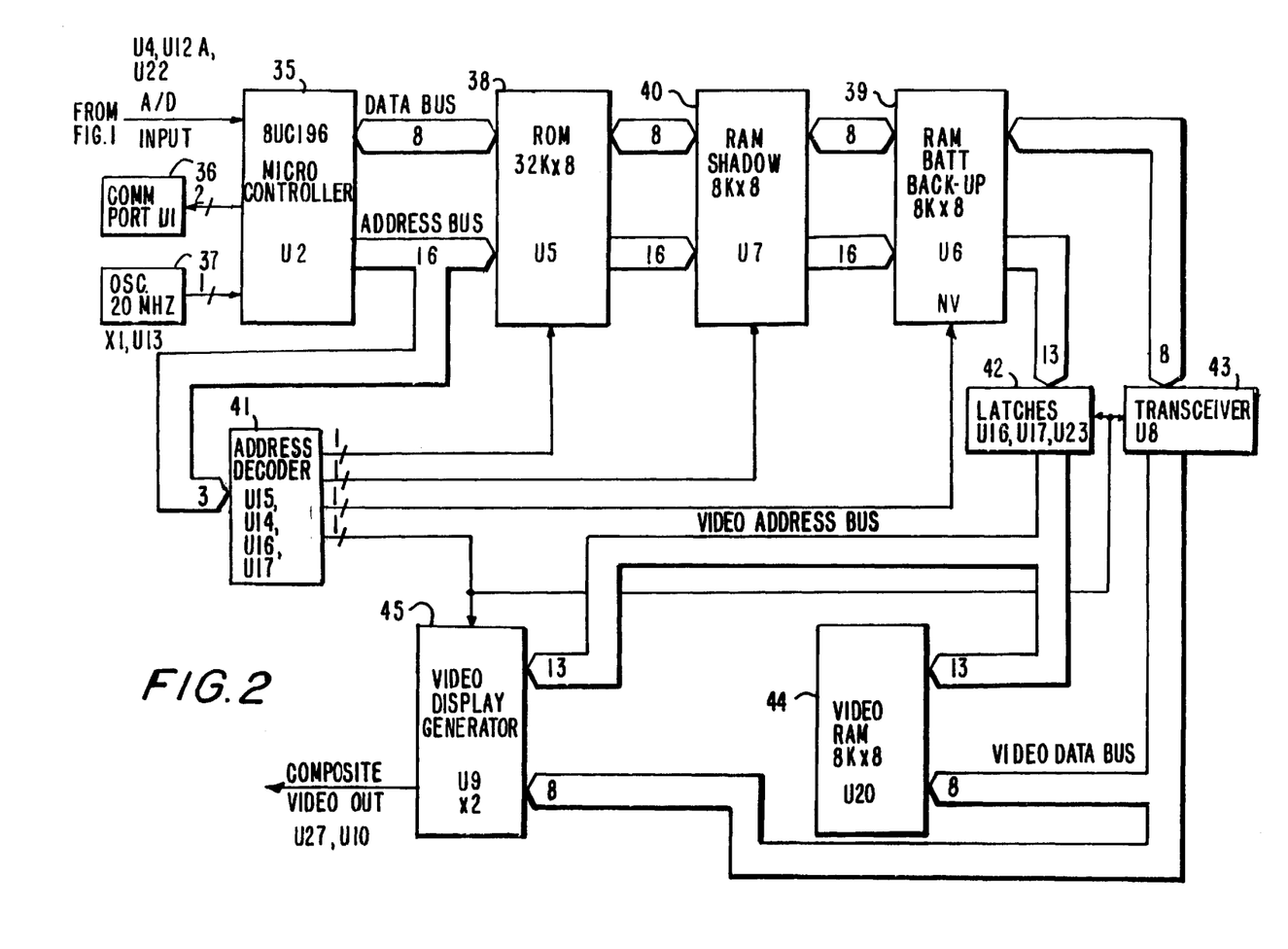
FIG. 2 is a block diagram of the RDU RF Module utilized in this novel CATV monitoring system.

FIG. 2 is a block diagram of the RDU RF module for the spectrum analyzer. The input frequency for the RF module has a range of 0 to 400 MHz. The input filter consists of a tunable low-pass filter 25 with a 400 MHz cut-off frequency. The low-pass filter used in the front end of the analyzer does not need to be frequency swept, so only the 1st local oscillator (LO) frequencies determine the frequency to which the spectrum analyzer is tuned. Since it is usually difficult to obtain the required selectivity at the high first IF, a second frequency conversion is required.

The frequency change relative to the tuning voltage change for the first LO is not constant, and a variable-slope input voltage must be provided. A ramp generator 26 is used to provide the sweep voltage for the horizontal time base and the tuning voltage for the first LO. Before being applied to the LO, the ramp voltage is attenuated by the scan (MHz/division or dispersion) control and added to a voltage from the front-panel frequency control, then fed to a variable-slope generator. The frequency change is also subjected to a prescaler 27 which divides the signal by a factor of 256 for the second IF and, a band-pass filter 28 with a cutoff frequency of 551 MHz is used. The second IF should be high enough so that the first IF filter can remove the image frequency. A second conversion is added, the frequency of the second LO 29 is fixed at 612 MHz or 616 MHz. A spectrum analyzer must be tuned rapidly and electronically so the entire input spectrum can be displayed. As a result, the first LO voltage is ramp voltage while the frequencies of the second and third LO's are fixed. This permits the entire spectrum analyzer input-frequency range to be swept by varying the frequency of a single oscillator.

For the third IF, a band pass filter 30 with a cutoff frequency of 61.5 MHz or 55.5 MHz is used. The frequency of the third LO 31 is 50.8 MHz or 44.8 MHz. An IF Amplifier and Filter 32 are used to convert the output to 10.7 MHz where standard receiver IF filters are used. A log amplifier 33 is required to create the logarithmic display. The output is directed through video processing circuits and an analog signal display is outputed.

Figure 3A:
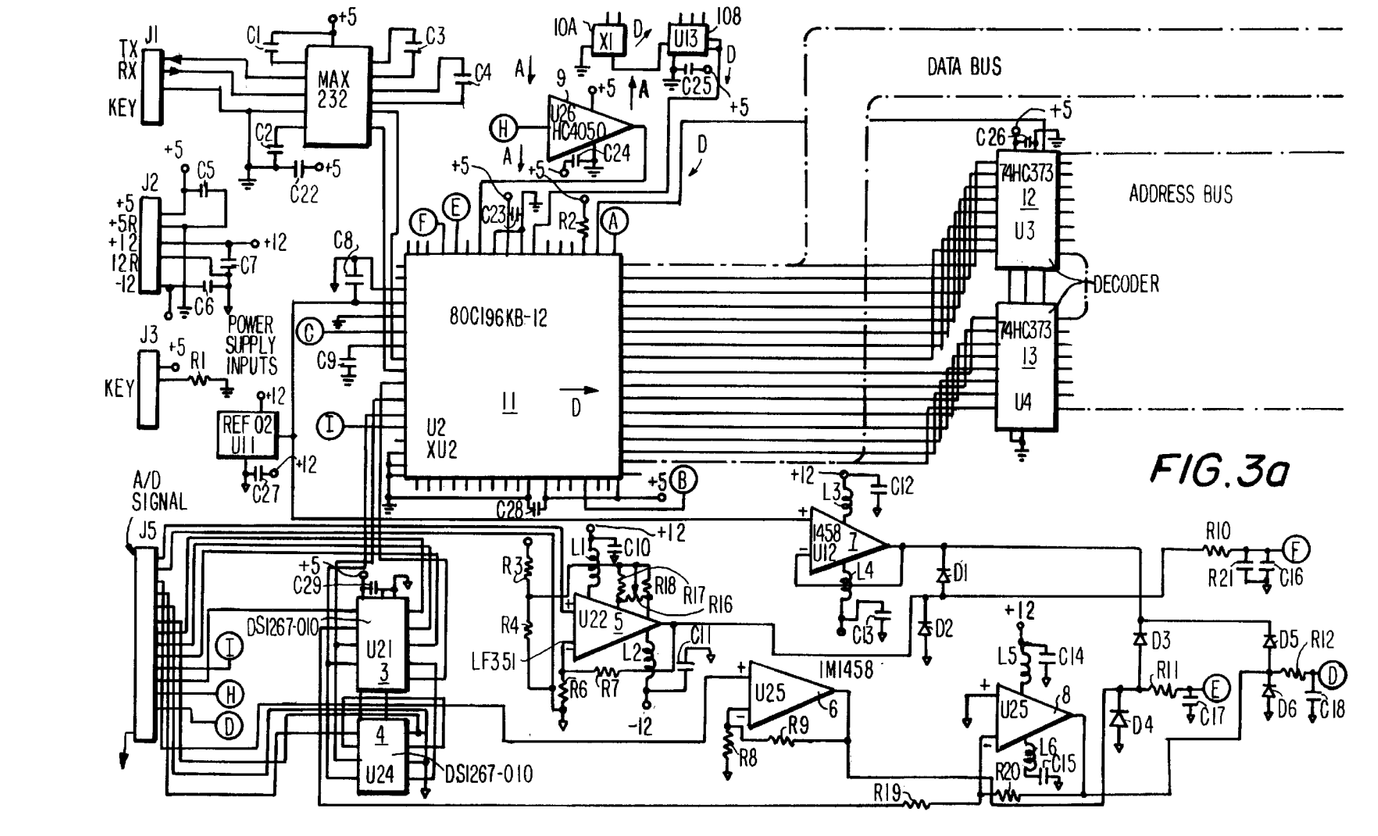
FIGS. 3a–3b are block diagrams of the RDU Digital Module utilized in this novel CATV monitoring system.
Figure 3B:
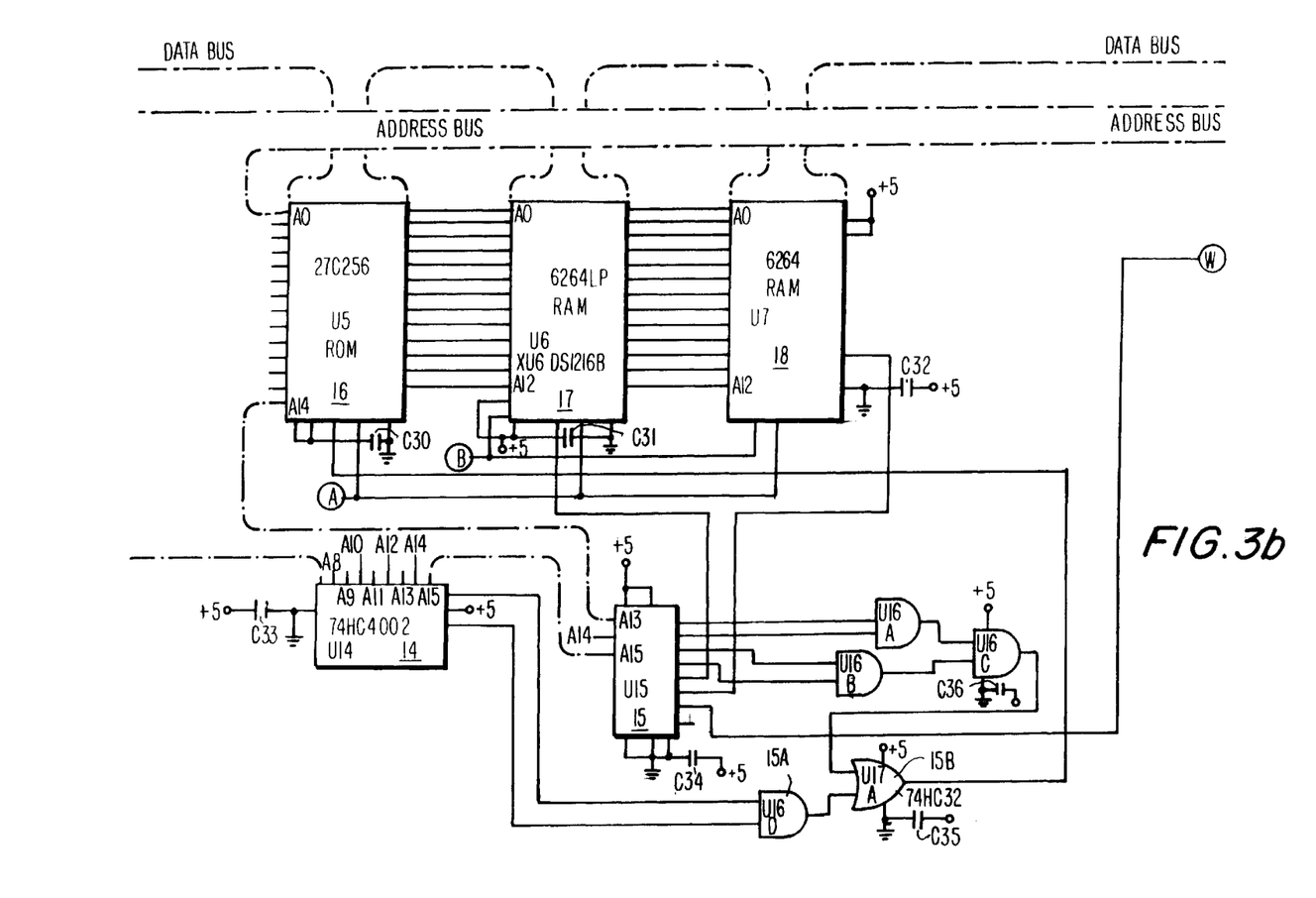
Figure 3C:
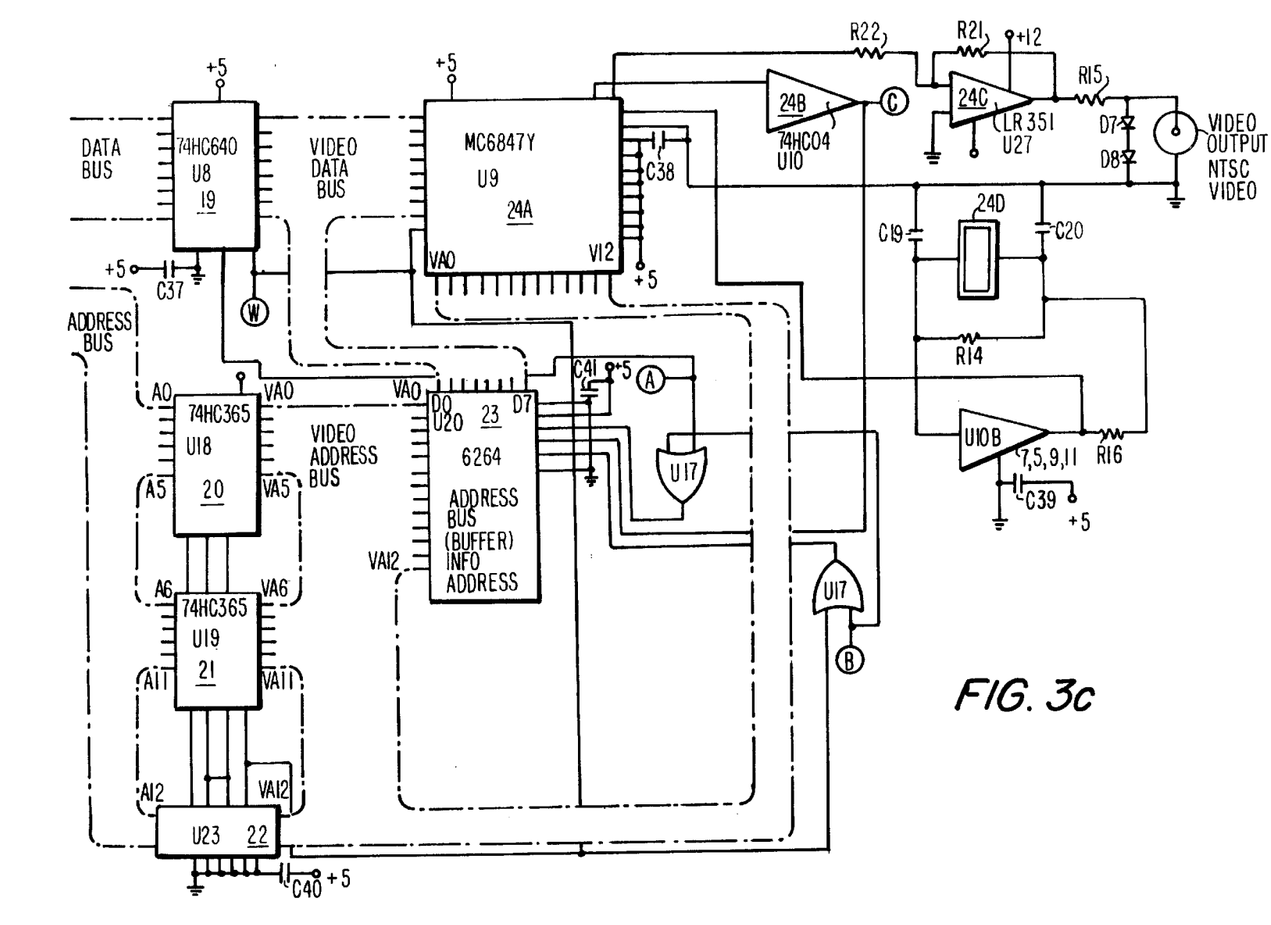

FIGS. 3a–3b are block diagrams of an RDU digital module which receives the output described in the RF module discussed in FIG. 2.

The signal from the spectrum analyzer has been amplified to about 4 volts to enable the (A/D) converter to format digitally. The (A/D) converter is a 10-Bit converter requiring an input signal in the range of 0 to +5 VDC. The digital signal transmitted by the (A/D) converter is inputted to the Microcontroller 35. Communication port 36 connected to the Microcontroller 35 allows the RDU system to be connected to an external P.C. Item 37 connected to the Microcontroller 35 is an Xtal Oscillator which maintains an accurate 20 MHz frequency for setting up the proper timing for the system, and also includes a flip flop which shapes the 20 MHz oscillation into a square wave of 10 MHz. This 10 MHz signal becomes the operating frequency for the Microcontroller 35. The Microcontroller 35 via output interfaces such as the data bus and address bus, control all of the timing requirements of the RDU and assign addresses to digital data. It is configured with an 8-Bit Data Bus. and a 16-Bit Address Bus. Digital signals are forwarded to ROM 38, which is a 32K×8 bit Read Only Memory. ROM 38 contains all of the software coding to operate the system, however, ROM 38 will not perform any data processing. ROM 38 continuously stores data in Non-Volatile RAM 39, which is an 8K×8 bit special low power RAM. Non-Volatile RAM 39 retains its memory even when power is turned off, due to a special battery back up socket. This battery back up socket contains a 3 volt battery and switching circuitry to maintain power to the RAM. Data is stored on the Non-Volatile RAM 39 on a real time basis. When it is full of data the data is subsequently stored on Shadow RAM 40. Shadow RAM 40 is an 8k×8 bit Static RAM, which is used for the temporary storage of video data. Every 500 milliseconds, it downloads data into video RAM 44. Four decoders 41 present on the address bus assign addresses to devices and act as traffic controllers for data flowing to ROM 38, RAM 39, Shadow RAM 40 and the video display generator 45. Data forwarded from Shadow RAM 40 is outputted to the video RAM 44 and Video Display Generator 45 via Latches 42 and a transceiver 43. Data is carried on the data bus and introduced to the transceiver 43, which includes a transceiver chip. The purpose of the transceiver is to isolate the Video Data Bus from the Main Data Bus. It allows the CPU Data Bus to write to Video RAM and can also read Video RAM onto the main Data Bus. The video data bus stemming from the transceiver 43 directs video data to video RAM 44 and the video display generator 45.

The information on the address bus coming from shadow RAM 40 is directed to latches 42. Latches isolate the Main Address Bus from the 13 bit Video Address Bus. They are selected and latched during address C000H to DFFFH, thus allowing the CPU to control the Video Address Bus. During all other addresses, the Video Display Generator 45 has command of the Video Address Bus.

Through the transceiver 43 the CPU Data Bus writes to Video RAM 44 via the Video Data Bus. 43. Video RAM, is an 8K×8 bit Static RAM. This chip is selected by a control line from the Video Display Generator. The display area on the screen consists of 256 horizontal bits and 192 vertical, thus 6,144 bits are used for bit mapping of the Video RAM.

A digital signal from the transceiver 43 via the video data bus is directed to the Video Display Generator 45 along with corresponding information from the address bus stemming for the latches. The Video Display Generator 45 is composed of a video display generator, an inverter, an amplifier and an oscillator.

The Video Display Generator, 45 is a Motorola MC6847Y. It sets up all the timing necessary to convert a digital signal from the Video Data Bus, to a composite signal, with all the proper NTSC levels and timing for output to standard TV screen, via a Modulator.

The inverter in the Video Display Generator is used to set up the right polarity to be used as an interrupt to the Microcontroller, to let it know when the Video Bus is available for CPU control. The Amplifier, is used to invert the NTSC composite video output and provide the proper drive and impedance for an external Modulator. The voltage required by the modulator is 1 volt, peak to peak. A 3.58 MHz Xtal Oscillator is used for the timing for the Video Display Generator chip.

The resulting signal from the Video Display Generator is a composite NTSC video format which is available to an external modulator and processed for output to a standard T.V. which displays return signals along with noise, impulse and other interferences.

Applicant's RDU unit requires an AC input of 110/220 vac and a current usage of preferably about 200 milliamps. The RDU unit has a frequency range preset to a preferred range of 2 to 42 MHz, which is adjustable to 2 to 55 MHz, ±1 MHz.

The display range for the RDU unit is preferably in the range of −30 db to +20 db, a display resolution of 200 KHz, a dynamic range of 70 db and an on screen range of 50 db.

An input independence of about 75 ohm is required for the RDU unit, an input level of 10 db Mv, a maximum input of 30 db Mv, an RF level accuracy of ±1 db and a flatness specification of ±1 db. Input/Output connectors are F type with an output of Ivp-p NCTS video.

Carrier level measurements for the RDU unit is 2 frequencies, preset to 5 and 40 MHz. These frequencies are field adjustable to 2 to 55 MHz, +/−100 KHz. On screen display, continuous update with a measurement update refresh of 500 milliseconds. The RDU unit has real time display with continuous input stored every 500 milliseconds.

The foregoing figures and descriptions thereof are illustrative of some of the preferred embodiments of this invention. While these embodiments represent the best modes for practicing this invention, they are not intended to limit the scope of the invention, which is set forth in the following claims:

What is claimed is:

1. A cable television monitoring system to monitor the return signals of a CATV system in a frequency range of 5–225 MHz and measures voltage and frequency parameters providing an analysis in NTSC compatible base-band video, which when modulated to a TV channel frequency and sent downstream in a cable TV system can be received at any point in a cable TV system, this invention comprises:

a micro controller programmed to provide a plurality of codes to control events in the system;

means for memory storage connected to said microcontroller for storing control code and data;

switching means connected to said microcontroller for providing operator input signals to said microprocessor;

signal processing means controlled by said microcontroller for sampling in time a plurality of incoming frequencies;

means to convert signal frequencies to a predetermined IF frequency;

means to convert analog measurements of amplitude and frequency to digital format controlled by said microcontroller;

means to transfer digitally formatted amplitude and frequency parameters to video storage RAM under control of said microcontroller;

means to transfer digital bits from video storage RAM to video display generator under control of said microcontroller, said video display generator converts video data bits into NTSC compatible composite base-band video with vertical and horizontal synchronization signals; and means to invert video base-band signals and to provide proper drive and impedance to match an external TV modulator.

2. The system of claim 1 wherein said analysis is transferred throughout said system by said microcontroller utilizing address and data buses.

3. The system of claim 2 wherein said data bus is configured as an 8 bit Data Bus.

4. The system of claim 2 wherein said address bus is configured as a 16 bit address bit.

5. The system of claim 1 wherein said memory means comprise read only memory, non-volatile random access memory and shadow ram access memory.

6. The system of claim 1 wherein said means to convert signal frequencies to a predetermined IF frequency include spectrum analyzer providing an ultimate IF bandwidth of about 10 KHz after one up conversion and two down conversions.

7. A method of monitoring the return system of a CATV system comprising:

injecting a plurality of signals from a carrier generator into a cable tv return path;

interpreting said signals to frequency domain and to an analog voltage;

digitizing said analog voltage by transmitting said analog voltage to an analog/digital converter;

transmitting said digitized signal for storage in shadow ram;

downloading said digitized signal for storage in video ram;

transmitting said digitized signal from video ram to a video display generator;

converting said digitized signal to a composite signal at proper NTSC levels and timing by use of said video display generator.

8. The method of claim 7 wherein said composite signal is outputted to a standard TV screen by use of a modulator.

9. The method of claim 7 wherein said digitized signal is transmitted for storage in shadow ram by use of a microcontroller and data and address buses.

10. The system of claim 7 wherein said digitized signal is transmitted to the video display generator by selective use of a video data bus.

11. A method of monitoring the return signals of a cable television return system, in a frequency range of 2–55 MHz and measuring voltage and frequency of all inputted signals, comprising the steps of:

receiving and inputting a return (upstream) signal to a spectrum analyzer at a headend in the frequency band of 2–55 MHz;

filtering the input signal at the spectrum analyzer thru a low pass filter, then up converting to a pre-determined first IF frequency, then filtering thru a band pass filter and down converting to a second predetermined IF, filtering said signal thru a second bandpass filter and down converting to a third IF frequency of 10.7 MHz;

amplifying said outputted 10.7 MHz signal thru a logarithmic amplifier proving a logarithmic analog signal indicative of frequency and amplitude of said inputted signal;

converting said analog signal to digital signal by transmitting said analog signal thru an analog/digital converter;

controlling said transmission of signals by using a micro controller;

transmitting said digital signal for storage in shadow ram;

downloading said signal from shadow ram to video ram;

downloading said signal from video ram to a video display generator;

generating a composite base-band video signal having proper NTSC levels and timing.

12. The method of claim 11 wherein said signal is downloaded from shadow ram to video ram every 500 milliseconds.

13. The method of claim 11 wherein said signal is downloaded to said video display generator via latches and a transreceiver and isolating a video data bus from a main data bus.

14. The method of claim 11 wherein said down converting in said spectrum analyzer is accomplished by mixing said inputted signal with a first oscillator frequency, sweeping from 516 MHz to 916 MHz by means of a tuning voltage generated by a ramp voltage generator.

15. The method of claim 11 wherein said inputted signal is down converted to a second IF and further down converted to a third IF of 10.7 MHz in said spectrum analyzer.

* * * * *